United States Patent
Chang et al.

(10) Patent No.: US 9,201,274 B2
(45) Date of Patent: *Dec. 1, 2015

(54) VERTICAL ALIGNMENT LIQUID CRYSTAL DISPLAY DEVICE AND METHOD FOR DRIVING SAME

(71) Applicant: InnoLux Corporation, Miao-Li County (TW)

(72) Inventors: Yueh-Ping Chang, Miao-Li County (TW); Chao-Yi Hung, Miao-Li County (TW)

(73) Assignee: INNOLUX CORPORATION, Miao-Li County (TW)

( * ) Notice: Subject to any disclaimer, the term of this patent is extended or adjusted under 35 U.S.C. 154(b) by 0 days.

This patent is subject to a terminal disclaimer.

(21) Appl. No.: 14/285,809

(22) Filed: May 23, 2014

(65) Prior Publication Data

US 2014/0253837 A1 Sep. 11, 2014

Related U.S. Application Data

(63) Continuation of application No. 14/185,342, filed on Feb. 20, 2014, which is a continuation of application No. 12/454,450, filed on May 18, 2009, now Pat. No. 8,692,752.

(30) Foreign Application Priority Data

May 16, 2008 (CN) .................. 2008 1 00672713

(51) Int. Cl.
*G02F 1/136* (2006.01)
*G02F 1/1343* (2006.01)
*G09G 3/36* (2006.01)
(Continued)

(52) U.S. Cl.
CPC .... *G02F 1/134309* (2013.01); *G02F 1/136286* (2013.01); *G09G 3/3659* (2013.01); *G02F 1/13624* (2013.01); *G02F 1/133707* (2013.01); *G02F 2203/30* (2013.01); *G09G 3/2025* (2013.01); *G09G 2300/0426* (2013.01); *G09G 2300/0447* (2013.01); *G09G 2300/0842* (2013.01); *G09G 2310/0224* (2013.01); *G09G 2310/0251* (2013.01); *G09G 2320/028* (2013.01)

(58) Field of Classification Search
None
See application file for complete search history.

(56) References Cited

U.S. PATENT DOCUMENTS 6,710,825 B2 3/2004 Kubo et al.
2005/0030460 A1* 2/2005 Kim et al. .............. 349/139

(Continued)

FOREIGN PATENT DOCUMENTS

| CN | 1540412 A | 10/2004 |
|---|---|---|
| CN | 101149548 A | 3/2008 |
| WO | 2007040158 A1 | 4/2007 |

*Primary Examiner* — Grant Sitta
*Assistant Examiner* — Kirk Hermann
(74) *Attorney, Agent, or Firm* — Bacon & Thomas, PLLC

(57) ABSTRACT

A vertical alignment liquid crystal display device (VA-LCD) includes a display panel. The display panel includes a plurality of pixels. Each pixel unit includes a first thin film transistor (TFT), a second TFT, and a liquid crystal capacitor having a pixel electrode and a common electrode. The common electrode is applied with a common voltage, a first gray voltage is applied to the pixel electrode through a first TFT, and a second gray voltage is applied to the pixel electrode through a second TFT different from the first gray voltage, such that liquid crystal capacitor maintains two different gray voltages in a display frame time of the VA-LCD.

11 Claims, 5 Drawing Sheets

(51) Int. Cl.
  *G02F 1/1337* (2006.01)
  *G02F 1/1362* (2006.01)
  *G09G 3/20* (2006.01)

(56) References Cited

U.S. PATENT DOCUMENTS

2006/0192747 A1  8/2006  Yoon et al.
2007/0013643 A1*  1/2007  Hong et al. .................... 345/100
2007/0018927 A1*  1/2007  Kim ................................ 345/92
2007/0057257 A1  3/2007  Kim
2008/0239182 A1  10/2008  Huang et al.
2009/0273743 A1  11/2009  Sawabe et al.
2010/0103339 A1  4/2010  Shimoshikiryoh et al.

* cited by examiner

000# VERTICAL ALIGNMENT LIQUID CRYSTAL DISPLAY DEVICE AND METHOD FOR DRIVING SAME

CROSS-REFERENCE TO RELATED APPLICATION

This application is a continuation application of, and claims priority to, U.S. patent application Ser. No. 14/185,342, filed Feb. 20, 2014, which is a continuation application of, and claims priority to, U.S. patent application Ser. No. 12/454,450, filed May 18, 2009 (now U.S. Pat. No. 8,692,752, issued Apr. 8, 2014), which claims the benefits of the China Patent Application 200810067271.3, filed on May 16, 2008, the entire contents of each of which are incorporated by reference herein.

BACKGROUND OF THE INVENTION

1. Field of the Invention

The present disclosure relates to a liquid crystal display device, and more particularly to a vertical alignment liquid crystal display (VA-LCD) device and a method for driving the VA-LCD device.

2. Description of Related Art

Since liquid crystal molecules in a liquid crystal display device emit no light themselves, illumination by a light source is necessary to display clear and sharp text and images. By controlling the torsion of liquid crystal molecules in the liquid crystal display device with gray voltages, the liquid crystal display device can control the transmission of light beams emitted from a light source, so that the liquid crystal display device can display images.

Twist-nematic type liquid crystal display (TN-LCD) devices, while commonly used, are limited by a correspondingly narrow viewing angle, such that different colors are viewed from different angles. To overcome the problem, a multi-domain vertical alignment liquid crystal display (MVA-LCD) device and a patterned vertically aligned liquid crystal display (PVA-LCD) device have been developed. By disposing a plurality of "<" shaped protrusions or grooves on the inner surfaces of substrates, each pixel of the MVA-LCD device or PVA-LCD device is divided into a plurality of domains. The liquid crystal molecules of each domain are aligned at different angles, so as to widen the viewing angle of the LCD device.

However, a long optical axis of the liquid crystal molecule has a refractive index different from that of a short optical axis of the liquid crystal molecule, generating color shift when viewed from different angles, thus the MVA-LCD device still has limited display quality.

What is needed, is an liquid crystal display device that can overcome the described limitations.

BRIEF DESCRIPTION OF THE DRAWINGS

The components in the drawings are not necessarily drawn to scale, the emphasis instead being placed upon clearly illustrating the principles of the present VA-LCD device and a method for driving the VA-LCD device. In the drawings, like reference numerals designate corresponding parts throughout various views, and all the views are schematic.

DETAILED DESCRIPTION OF THE PREFERRED EMBODIMENT

Reference will now be made to the drawings to describe exemplary embodiments of the present disclosure in detail.

Figure 1:
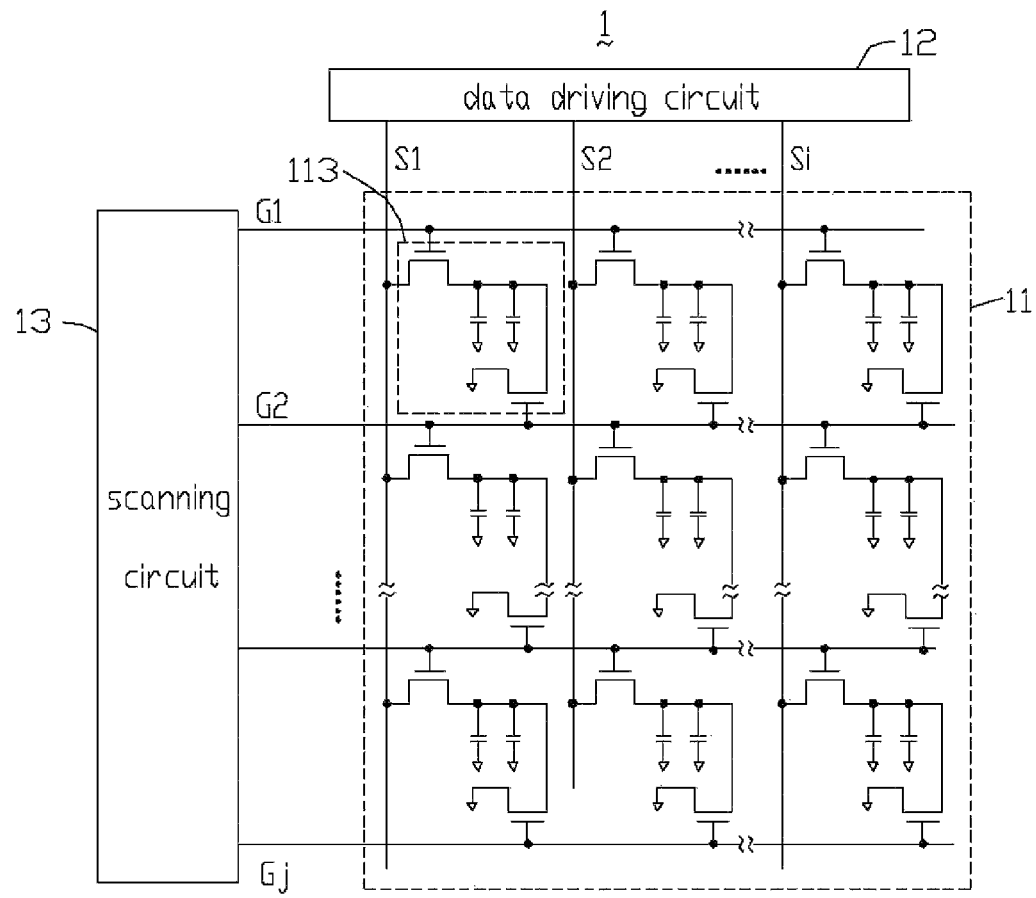
FIG. 1 is a schematic circuit diagram of a first embodiment of a VA-LCD device according to the present disclosure, the VA-LCD including a plurality of pixels.

FIG. 1 is a schematic circuit diagram of a first embodiment of a VA-LCD device 1 according to the present disclosure. The VA-LCD device 1 includes a display panel 11, a data driving circuit 12, and a scanning circuit 13.

The display panel 11 includes a plurality of parallel scan lines G1~Gj, and a plurality of data lines S1~Si parallel to each other and orthogonal to the scan lines G1~Gj. The scan lines G1~Gj and the data lines S1~Si cooperatively define a plurality of pixels 113.

Figure 2:
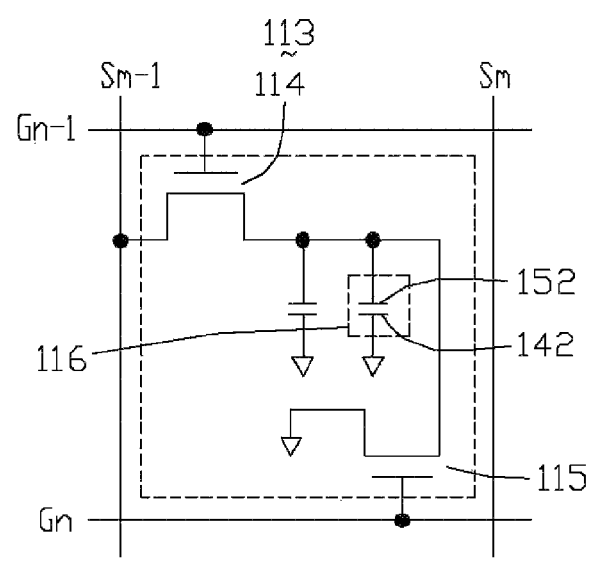
FIG. 2 is an enlarged view of a pixel of the VA-LCD device of FIG. 1.

FIG. 2 is an enlarged view of a pixel 113 of the VA-LCD device 1 of FIG. 1. The data line Sm-1 and the data line Sm together with the scan line Gn-1 and the scan line Gn define the m×n'th pixel 113, m and n represent any natural number, and $1 \le m \le i$, $1 \le n < j$, so the m×n'th pixel 113 represents any pixel 113 of the VA-LCD device 1.

The m×n'th pixel 113 includes a first thin film transistor (TFT) 114, a pixel electrode 152, a common electrode 142 opposite to the pixel electrode 152 and a second TFT 115. The common electrode 142 is electrically connected to a common voltage Vcom. A drain of the first TFT 114 is electrically connected to the pixel electrode 152, a source thereof is electrically connected to the data line Sm-1, and a gate thereof is electrically connected to the scan line Gn-1. A drain of the second TFT 115 is electrically connected to the pixel electrode 152, a source thereof is electrically connected to the common voltage Vcom, and a gate thereof is electrically connected to the scan line Gn. The pixel electrode 152 together with the common electrode 142 forms a liquid crystal capacitor 116 maintaining gray voltages.

The electrical characteristic of the second TFT 115 is different from that of the first TFT 114. A switch-on resistance of the second TFT 115 is greater than that of the first TFT 114. While the same gate voltage is applied to the gates of the first TFT 114 and the second TFT 115, and the same voltage is applied to the drains and the sources of the first TFT 114 and the second TFT 115, current through the first TFT 114 is greater than that through the second TFT 115.

Figure 3:
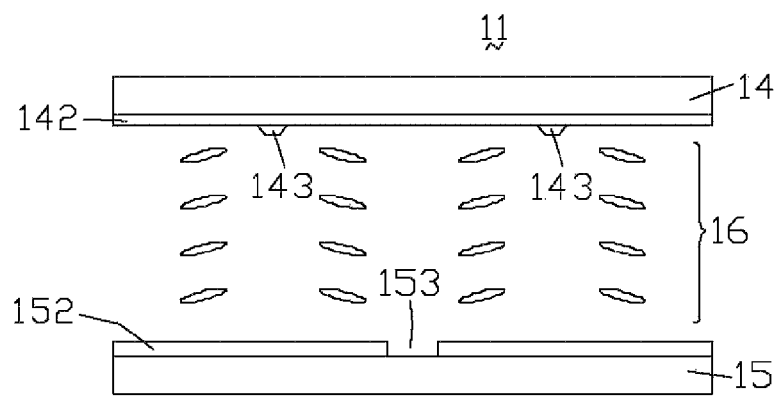
FIG. 3 is a schematic side view of a pixel of a display panel of the VA-LCD device of FIG. 1.
Figure 4:
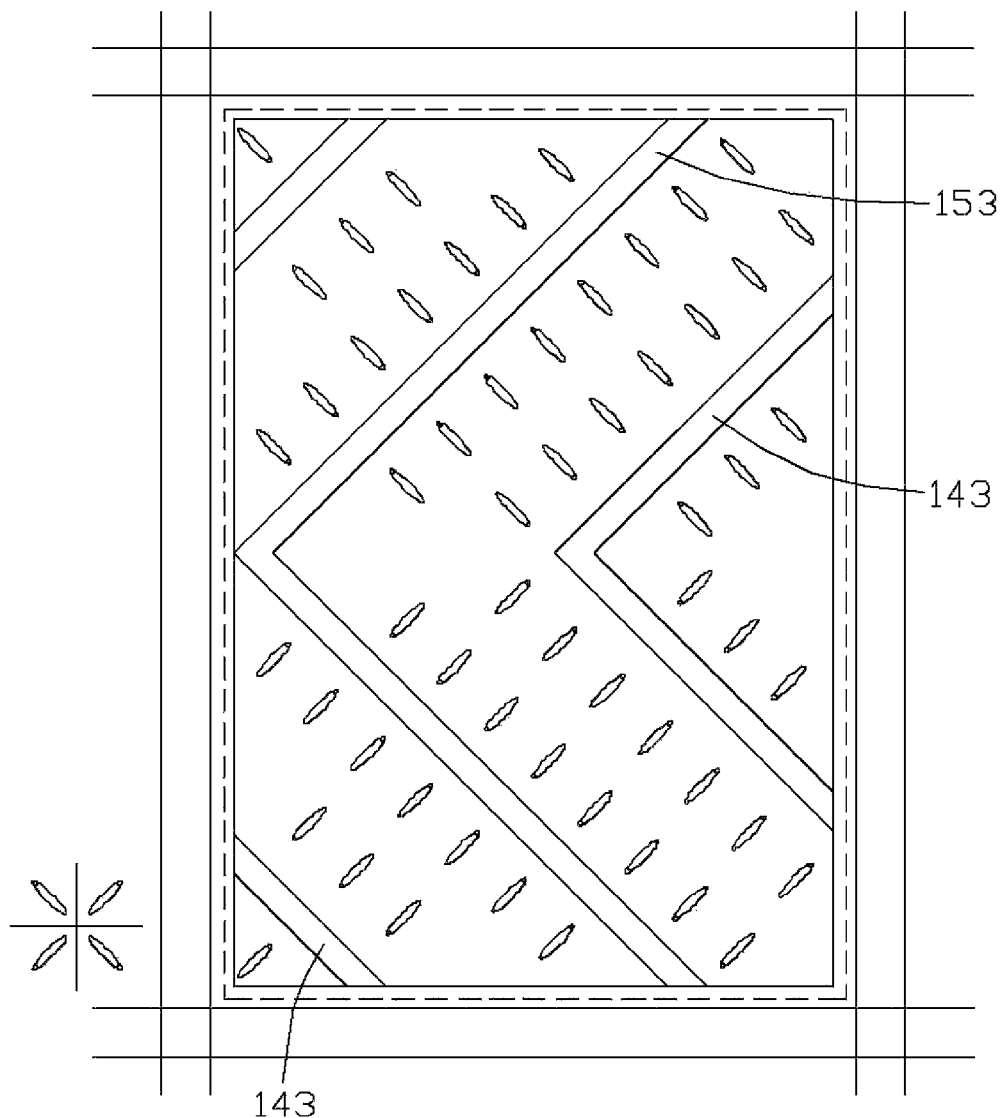
FIG. 4 is a schematic plan view of the pixel of the display panel of the VA-LCD device of FIG. 3.

FIG. 3 shows a schematic side view of a pixel 113 of the display panel 11 of the VA-LCD device 1 of FIG. 1. FIG. 4 shows a schematic plan view of the pixel 113. The display panel 11 further includes a first substrate 14, a second substrate 15, and a liquid crystal layer 16 disposed between the first substrate 14 and the second substrate 15. The common electrode 142 is disposed on a surface of the first substrate 14 that faces the liquid crystal layer 16. A plurality of "<" shaped protrusions 143 are disposed on a surface of the common electrode 142 that faces the liquid crystal layer 16. The pixel electrode 152 is disposed on a surface of the second substrate 15 that faces the liquid crystal layer 16. A plurality of "<" shaped grooves 153 are formed in the pixel electrode 152. Each "<" shaped groove 153 is disposed between two "<" shaped protrusions 143, and each "<" shaped protrusion 143 is disposed between two "<" shaped grooves 153.

Figure 5:
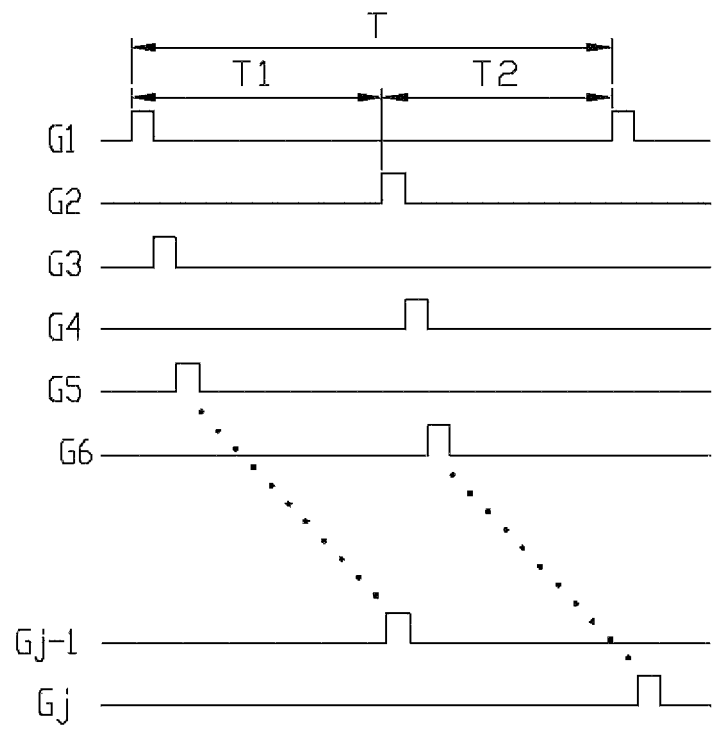
FIG. 5 is a waveform graph of scanning signals of the VA-LCD device of FIG. 1.

FIG. 5 is a waveform graph of scanning signals of the VA-LCD device 1 of FIG. 1. An interlacing scanning method is employed in the VA-LCD device 1. In detail, one display frame time T of the VA-LCD device 1 is divided into two sequential substantially equal sub-display frame times T1, T2. In sub-display frame time T1, the scanning circuit 13 sends scanning signals to the odd row scanning lines G1~Gj-1 one after another; and in sub-display frame time T2, the scanning circuit 13 sends scanning signals to the even row scan lines G2~Gj one after another. Thus, for the m×n'th pixel 113, in the display frame time T, the time between the scanning circuit 13 sending a scanning signal to the scan line Gn-1 and sending a scanning signal to the scan line Gn is substantially half a display frame time T.

Figure 6:
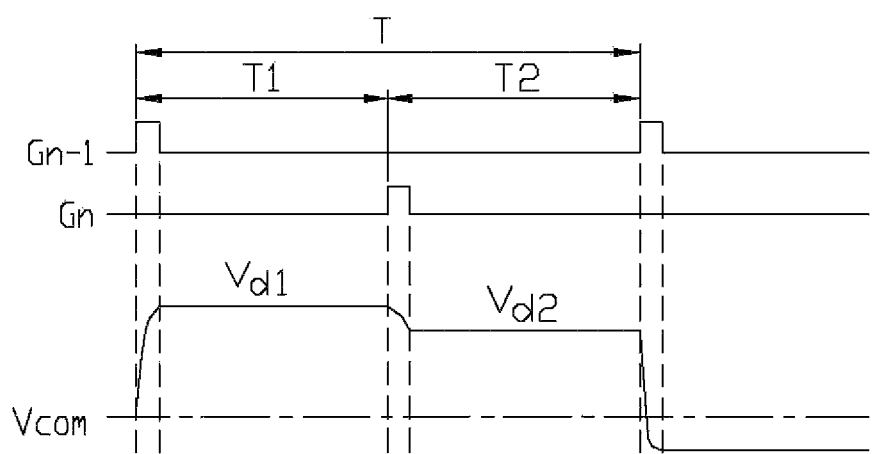
FIG. 6 is a waveform graph of driving signals of the VA-LCD device of FIG. 1.
Figure 7:
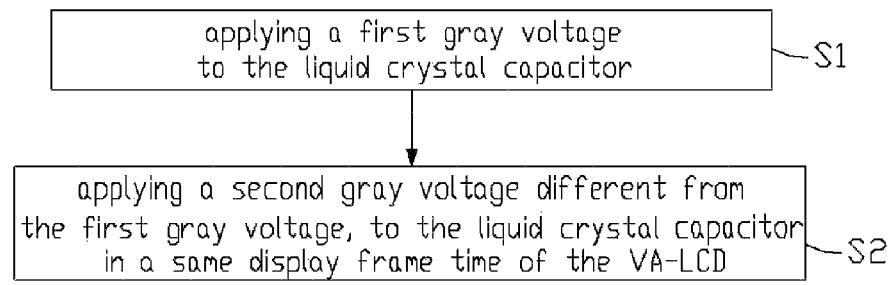
FIG. 7 is a flowchart of an exemplary method for driving the VA-LCD device of FIG. 1.

FIG. 6 is a waveform graph of driving signals of the VA-LCD device 1 of FIG. 1. FIG. 7 is a flow chart of an exemplary method for driving the VA-LCD device 1. The method for driving the VA-LCD device 1 is described as below.

In step S1, for the m×n'th pixel 113, the scanning circuit 13 sends a scanning signal to the scan line Gn-1. The scanning signal drives the first TFT 114 to be switched on. Then the data driving circuit 12 outputs a first gray voltage Vd1. The first gray voltage Vd1 charges the liquid crystal capacitor 116 through the data line Sm and the first TFT 114. As the first TFT 114 is switched off, the liquid crystal capacitor 116 maintains the first gray voltage Vd1. Driven by the first gray voltage Vd1, the electric field formed between the pixel electrode 152 and the common electrode 142 inclines to four different orientations because of the "<" shaped protrusions 143 and grooves 153 disposed in the pixel 113 and one protrusion 143 being disposed between every two grooves 153. The declining electric field make liquid crystal molecules of the m×n'th pixel 113 align to four different orientations. A four-domain display is achieved.

In step S2, half a display frame time T After the scanning circuit 13 sending a scanning signal to the scan line Gn-1, the scanning circuit 13 sends a scanning signal to the scan line Gn. When the scanning signal switches the second TFT 115 on, the liquid crystal capacitor 116 discharges through the second TFT 115. As the switch-on resistance of the second TFT 115 is greater than that of the first TFT 114, when the second TFT 115 is switched on by the scanning signal, the liquid crystal capacitor 116 discharges incompletely. As the second TFT 115 is switched off, the liquid crystal capacitor 116 maintains a second gray voltage Vd2 lower than the first gray voltage Vd1. Thus, another four-domain display is achieved. Therefore, in the display frame time T of the VA-LCD device, the m×n'th pixel 113 achieves an eight-domain display.

In summary, for each pixel 113 of the VA-LCD device 1, in the sub-display frame time T1, the liquid crystal capacitor 116 maintains the first gray voltage Vd1, and in the sub-display frame time T2, the liquid crystal capacitor 116 maintains the second gray voltage Vd2. Then, the four-domain VA-LCD device 1 achieves an eight-domain display. Therefore, the VA-LCD device 1 reduces color shift, and achieves a higher display quality.

Figure 8:
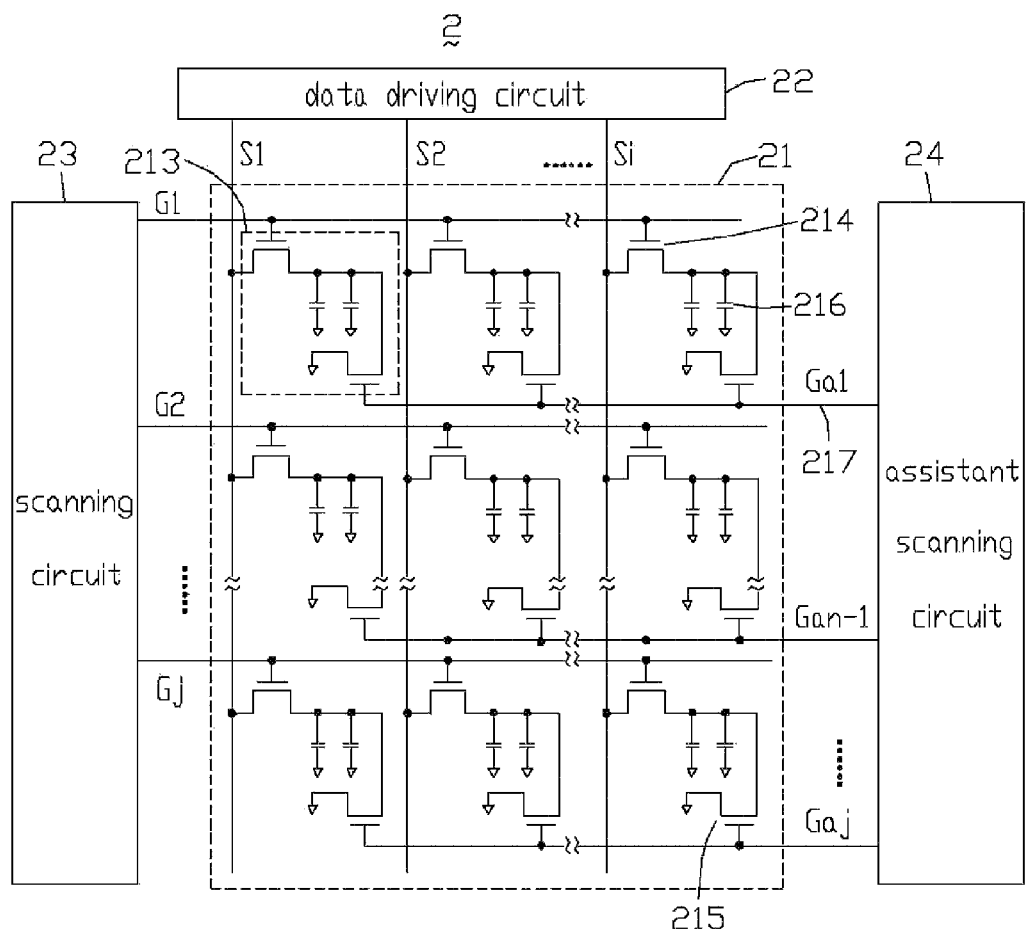
FIG. 8 is a schematic circuit of a second embodiment of a VA-LCD device according to the present disclosure.

FIG. 8 is a schematic circuit diagram of a VA-LCD device according to a second embodiment of the present disclosure, differing from the VA-LCD device 1 of the first embodiment in the further inclusion of an assistant scanning circuit 24. The display panel 21 further includes a plurality of assistant scan lines Ga1~Gaj electrically connected to the assistant scanning circuit 24. The electrical characteristic of the first TFT 214 and the second TFT 215 are the same. In each pixel 213, a gate of the second TFT 215 is electrically connected to a corresponding assistant scan line Gan.

Figure 9:
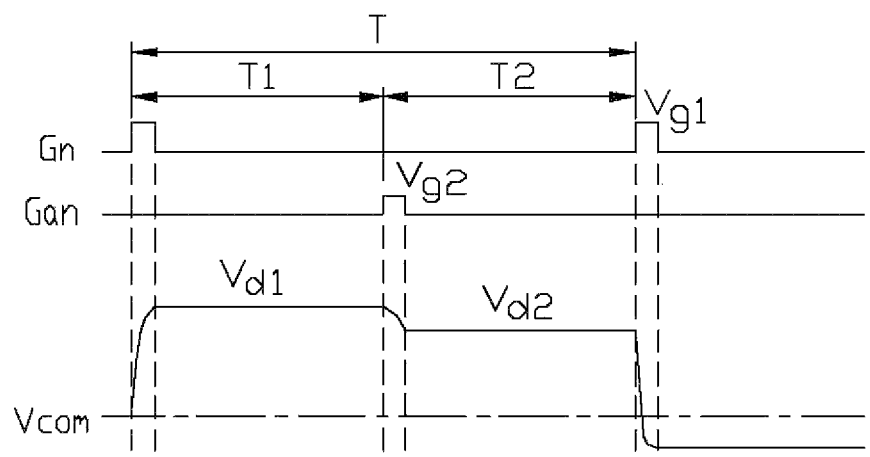
FIG. 9 is a waveform graph of driving signals of the VA-LCD device of FIG. 8.

FIG. 9 is a waveform graph of driving signals of the VA-LCD device 2 of FIG. 8. In operation of the VA-LCD device 2, in a display frame time T of the VA-LCD device, the scanning circuit 23 sends a first scanning signal Vg1 to the scan line Gn, and switches the first TFT 214 on. The liquid crystal capacitor 216 maintains a first gray voltage Vd1. After half a display frame time T, the assistant scanning circuit 24 sends a second scanning signal Vg2 lower than the first scanning signal Vg1 to the corresponding assistant scan line Gan. The second scanning signal Vg2 switches the second TFT 215 on, and the liquid crystal capacitor 216 discharges through the second TFT 215. Since the second scanning signal Vg2 is lower than the first scanning signal Vg1, the liquid crystal capacitor 216 maintains a second gray voltage Vd2 different from the first gray voltage Vd1.

In summary, the four-domain VA-LCD device 2 can achieve an eight-domain display, such that the VA-LCD device 2 can reduce color shift and improve display quality. The electrical characteristics of the first TFT 214 and the second TFT 215 are the same, making the VA-LCD device 2 easier to fabricate.

Alternatively, the VA-LCD device 1, 2 can be any PVA-LCD device, or any MVA-LCD device. A threefold or fourfold interlacing scanning method can also be applied in the VA-LCD device 1. In the VA-LCD device 2, the assistant scanning circuit 24 can also send a scanning signal having ⅓ display frame time delay to that sent by the scanning circuit 23. The time between the assistant scanning circuit 24 sending a scanning signal and that sent by the scanning circuit 23 can be between about ¼ display frame time to about ¾ display frame time.

It is to be further understood that even though numerous characteristics and advantages of preferred and exemplary embodiments have been set out in the foregoing description, together with details of the structures and functions of the embodiments, the disclosure is illustrative only; and that changes may be made in detail within the principles of the present disclosure to the full extent indicated by the broad general meaning of the terms in which the appended claims are expressed.

What is claimed is:

1. A liquid crystal display (LCD) device, comprising:
a display panel comprising a plurality of pixels, a plurality of data lines, and a plurality of scan lines intersecting the plurality of data lines, the plurality of scan lines and the plurality of data lines defining the plurality of pixels, a first pixel of the plurality of pixels comprising a first thin film transistor (TFT), a second TFT, a pixel electrode, and a liquid crystal capacitor, the first TFT and the second TFT being directly connected to the same liquid crystal capacitor, the second TFT having a switch-on resistance greater than that of the first TFT,
wherein in a display frame time of the LCD, the pixel electrode is applied with a first gray voltage and a second gray voltage such that the liquid crystal capacitor maintains the first gray voltage and the second gray voltage in succession, the first gray voltage being different from the second gray voltage.

2. The liquid crystal display (LCD) device of claim 1, wherein in the first pixel, a common voltage is electrically connected to a source of the second TFT, a drain of the second TFT is electrically connected to the pixel electrode directly, a source of the first TFT is electrically connected to the first data line, and a drain of the first TFT is electrically connected to the pixel electrode directly.

3. The liquid crystal display (LCD) device of claim 2, wherein an absolute value of the second gray voltage is lower than that of the first gray voltage.

4. The liquid crystal display (LCD) device of claim 3, wherein a gate of the first TFT and a gate of the second TFT are electrically connected to the different scan lines adjacent to the pixel, respectively.

5. The liquid crystal display (LCD) device of claim 4, wherein the first gray voltage is applied to the pixel electrode through the plurality of data lines and the first TFT, and the second gray voltage is applied to the pixel electrode through the common voltage and the second TFT.

6. The liquid crystal display (LCD) device of claim 5, wherein the liquid crystal display (LCD) device is a vertical alignment liquid crystal display (VA-LCD) device.

7. The liquid crystal display (LCD) device of claim 6, wherein the first pixel has an eight-domain display in the display frame time.

8. A liquid crystal display (LCD) device, comprising:
a plurality of scan lines, a plurality of data lines interlacing to the scan lines, and a plurality of pixels defined by the plurality of scan lines and the plurality of data lines, a first pixel of the plurality of pixels comprising a first thin film transistor (TFT), a second TFT, a pixel electrode, and a liquid crystal capacitor, the first TFT and the second TFT being directly connected to the same liquid crystal capacitor, a switch-on resistance of the second TFT being greater than a switch-on resistance of the first TFT,
wherein in a first period of a display frame time of the LCD, one of the data lines applies a first gray voltage to the pixel electrode via the first TFT such that the liquid crystal capacitor maintains the first gray voltage in the first period, and in a second period of the display frame time of the LCD, the liquid crystal capacitor discharges through the second TFT such that the liquid crystal capacitor maintains a second gray voltage different from the first gray voltage in the second period.

9. The liquid crystal display (LCD) device of claim 8, wherein a gate of the first TFT is connected to a first scan line of the plurality of scan lines, a source of the first TFT is connected to a first data line of the plurality of data lines, a drain of the first TFT is connected to the pixel electrode, a gate of the second TFT is connected to a second scan line of the plurality of scan lines, a source of the second TFT is connected to a common voltage, and a drain of the second TFT is connected to the pixel electrode.

10. The liquid crystal display (LCD) device of claim 9, wherein the liquid crystal display (LCD) device is a vertical alignment liquid crystal display (VA-LCD) device.

11. The liquid crystal display (LCD) device of claim 10, wherein the first pixel has an eight-domain display in the display frame time.

\* \* \* \* \*